United States Patent
Fan et al.

[11] Patent Number: 6,104,698
[45] Date of Patent: Aug. 15, 2000

[54] ASYNCHRONOUS TRANSFER MODE EXCHANGE SYSTEM AND PRIORITY CONTROL METHOD

[75] Inventors: Ruixue Fan; Masayuki Shinohara, both of Tokyo, Japan

[73] Assignee: NEC Corporation, Japan

[21] Appl. No.: 08/739,173

[22] Filed: Oct. 30, 1996

[30] Foreign Application Priority Data

Oct. 31, 1995 [JP] Japan .................................. 7-326183

[51] Int. Cl.[7] .................................................. H04L 12/56
[52] U.S. Cl. ............................ 370/232; 370/398; 370/429
[58] Field of Search ................................. 370/229, 230, 370/231, 232, 233, 234, 235, 236, 252, 253, 395, 396, 398, 412, 413, 414, 415, 416, 417, 418, 428, 429

[56] References Cited

U.S. PATENT DOCUMENTS

| | | | |
|---|---|---|---|
| 5,282,203 | 1/1994 | Oouchi .................................. | 370/232 |
| 5,499,238 | 3/1996 | Shon ..................................... | 370/399 |
| 5,509,001 | 4/1996 | Tachibana et al. .................... | 370/230 |
| 5,539,747 | 7/1996 | Ito et al. .............................. | 370/235 |
| 5,555,264 | 9/1996 | Sallberg et al. ....................... | 370/414 |
| 5,555,265 | 9/1996 | Kakuma et al. ....................... | 370/395 |
| 5,581,544 | 12/1996 | Hamada et al. ...................... | 370/253 |
| 5,583,857 | 12/1996 | Soumiya et al. ...................... | 370/233 |
| 5,640,389 | 6/1997 | Masaki et al. ........................ | 370/418 |
| 5,696,764 | 12/1997 | Soumiya et al. ...................... | 370/395 |

OTHER PUBLICATIONS

R. Fan, et al., "Expandable Atom Switch Architecture (XATOM) for ATM LANs", IEEE 1994, pp. 402–409, no date avail.

*Primary Examiner*—Chi H. Pham
*Assistant Examiner*—Kwang B. Yao
*Attorney, Agent, or Firm*—Ostrolenk, Faber, Gerb & Soffen,

[57] ABSTRACT

A call reception control circuit 1 sets each guaranteed band width required for assuring communication quality of the respective band width demand classes in the corresponding N counter Nc, Ntv and Nv at a certain time interval Ts. The call reception control circuit 1 also sets values defined by the ratio of the W counter Wabr and Wubr of the respective best effort class to use the remained band width. The value 1 is subtracted from each value of the N counter Nc, Ntv and Nv and W counter Wabr and Wubr at every output of the cell from the corresponding class. A priority control process circuit 2 outputs cells to an output channel 3 according to priority levels giving a priority to the band width demand class having the value of the N counter not set to 0 over the band width demand class and the best effort classes having the value of the N counter set to 0.

34 Claims, 16 Drawing Sheets

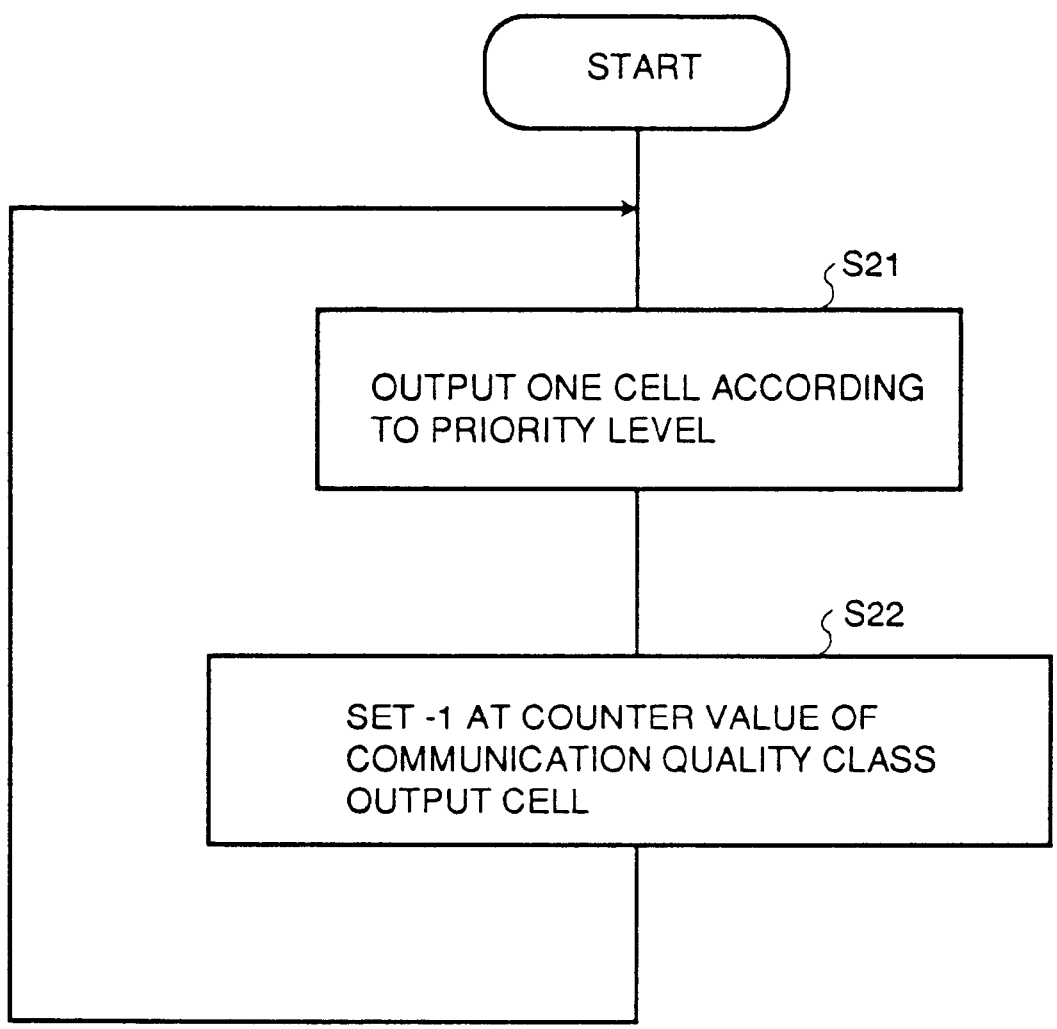

FIG.5

PRIORITY 1 : CBR CLASS HAVING N COUNTER Nc VALUE LARGER THAN 0
PRIORITY 2 : rt-VBR CLASS HAVING N COUNTER Ntv VALUE LARGER THAN 0
PRIORITY 3 : nrt-VBR CLASS HAVING N COUNTER Nv VALUE LARGER THAN 0
PRIORITY 4 : ABR CLASS HAVING W COUNTER Wabr VALUE LARGER THAN 0
PRIORITY 4 : UBR CLASS HAVING W COUNTER Wubr VALUE LARGER THAN 0
PRIORITY 5 : CBR CLASS HAVING N COUNTER Nc VALUE SET TO 0
PRIORITY 6 : rt-VBR CLASS HAVING N COUNTER Ntv VALUE SET TO 0
PRIORITY 7 : nrt-VBR CLASS HAVING N COUNTER Nv VALUE SET TO 0

THE WEIGHTED ROTATIONAL PRIORITY CONTROL IS EXECUTED AMONG CLASSES AT THE SAME PRIORITY LEVEL.

FIG.6

PRIORITY 1 : CBR CLASS HAVING N COUNTER Nc VALUE LARGER THAN 0
PRIORITY 1 : rt-VBR CLASS HAVING N COUNTER Ntv VALUE LARGER THAN 0
PRIORITY 1 : nrt-VBR CLASS HAVING N COUNTER Nv VALUE LARGER THAN 0
PRIORITY 2 : ABR CLASS HAVING W COUNTER Wabr VALUE LARGER THAN 0
PRIORITY 2 : UBR CLASS HAVING W COUNTER Wubr VALUE LARGER THAN 0
PRIORITY 3 : CBR CLASS HAVING N COUNTER Nc VALUE SET TO 0
PRIORITY 3 : rt-VBR CLASS HAVING N COUNTER Ntv VALUE SET TO 0
PRIORITY 3 : nrt-VBR CLASS HAVING N COUNTER Nv VALUE SET TO 0

THE WEIGHTED ROTATIONAL PRIORITY CONTROL IS EXECUTED AMONG CLASSES AT THE SAME PRIORITY LEVEL.

AS FOR THE PRIORITY LEVELS 1 AND 3, THE VALUE CONFORMING TO THE GUARANTEED BAND OF THE RESPECTIVE CLASSES IS USED AS THE WEIGHT.

FIG.8

PRIORITY 1 :   CBR CLASS HAVING N COUNTER Nc VALUE LARGER THAN 0
PRIORITY 2 :   rt-VBR CLASS HAVING N COUNTER Ntv VALUE LARGER THAN 0
PRIORITY 3 :   nrt-VBR CLASS HAVING N COUNTER Nv VALUE LARGER THAN 0
PRIORITY 4 :   CBR CLASS HAVING N COUNTER Nc VALUE SET TO 0 AND
               S COUNTER Sc VALUE LARGER THAN 0
PRIORITY 5 :   rt-VBR CLASS HAVING N COUNTER Ntv VALUE SET TO 0 AND
               S COUNTER Stv VALUE LARGER THAN 0
PRIORITY 6 :   nrt-VBR CLASS HAVING SUM OF N COUNTER Nv VALUE SET TO 0
               AND S COUNTER Sv VALUE LARGER THAN 0
PRIORITY 7 :   ABR CLASS HAVING A SUM OF W COUNTER Wabr VALUE AND
               S COUNTER Sabr VALUE LARGER THAN 0
PRIORITY 7 :   UBR CLASS HAVING SUM OF W COUNTER Wubr VALUE AND
               S COUNTER Subr VALUE LARGER THAN 0
PRIORITY 8 :   CBR CLASS HAVING BOTH VALUES OF N COUNTER Nc VALUE AND
               S COUNTER Sc SET TO 0
PRIORITY 9 :   rt-VBR CLASS HAVING BOTH VALUES OF N COUNTER Ntv VALUE AND
               S COUNTER Stv SET TO 0
PRIORITY 10 :  nrt-VBR CLASS HAVING BOTH VALUES OF N COUNTER Nv VALUE AND
               S COUNTER Sv SET TO 0

THE WEIGHTED ROTATIONAL PRIORITY CONTROL IS EXECUTED AMONG CLASSES
AT THE SAME PRIORITY LEVEL.

FIG.9

PRIORITY 1 : CBR CLASS HAVING N COUNTER Nc VALUE LARGER THAN 0
PRIORITY 1 : rt-VBR CLASS HAVING N COUNTER Ntv VALUE LARGER THAN 0
PRIORITY 1 : nrt-VBR CLASS HAVING N COUNTER Nv VALUE LARGER THAN 0
PRIORITY 2 : CBR CLASS HAVING N COUNTER Nc VALUE SET TO 0 AND
 S COUNTER Sc VALUE LARGER THAN 0
PRIORITY 2 : rt-VBR CLASS HAVING N COUNTER Ntv VALUE SET TO 0 AND
 S COUNTER Stv VALUE LARGER THAN 0
PRIORITY 2 : nrt-VBR CLASS HAVING N COUNTER Nv VALUE SET TO 0 AND
 S COUNTER Sv VALUE LARGER THAN 0
PRIORITY 3 : ABR CLASS HAVING SUM OF W COUNTER Wabr VALUE AND
 S COUNTER Sabr VALUE LARGER THAN 0
PRIORITY 3 : UBR CLASS HAVING SUM OF W COUNTER Wubr VALUE AND
 S COUNTER Subr VALUE LARGER THAN 0
PRIORITY 4: CBR CLASS HAVING BOTH VALUES OF N COUNTER Nc VALUE AND
 S COUNTER Sc VALUE SET TO 0
PRIORITY 4: rt-VBR CLASS HAVING BOTH VALUES OF N COUNTER Ntv AND
 S COUNTER Stv SET TO 0
PRIORITY 4: nrt-VBR CLASS HAVING BOTH VALUES OF N COUNTER Nv AND
 S COUNTER Sv SET TO 0

THE WEIGHTED ROTATIONAL PRIORITY CONTROL IS EXECUTED AMONG CLASSES
AT THE SAME PRIORITY LEVEL.

AS FOR THE PRIORITY LEVEL 1, 2 AND 4, THE VALUE CONFORMING TO THE GUARANTEED
BANDWIDTH OF THE RESPECTIVE CBR CLASS, rt-VBR CLASS AND nrt-VBR CLASS THAT HAS
BEEN SET BY THE CALL RECEPTION CONTROL CIRCUIT 11 IS USED AS THE WEIGHT.

FIG.11

PRIORITY 1 : CBR CLASS HAVING N COUNTER Nc VALUE LARGER THAN 0
PRIORITY 2 : rt-VBR CLASS HAVING N COUNTER Ntv VALUE LARGER THAN 0
PRIORITY 3 : nrt-VBR CLASS HAVING N COUNTER Nv VALUE LARGER THAN 0
PRIORITY 4 : CBR CLASS HAVING N COUNTER Nc VALUE SET TO 0, S COUNTER
Sc VALUE LARGER THAN 0 AND WAITING QUEUE LENGTH Qc
LARGER THAN THRESHOLD VALUE Thc1
PRIORITY 5 : rt-VBR CLASS HAVING N COUNTER Ntv VALUE SET TO 0, S COUNTER
Stv VALUE LARGER THAN 0 AND WAITING QUEUE LENGTH Qtv
LARGER THAN THRESHOLD VALUE Thtv1
PRIORITY 6 : nrt-VBR CLASS HAVING N COUNTER Nv VALUE SET TO 0, S COUNTER
Sv VALUE LARGER THAN 0 AND WAITING QUEUE LENGTH Qv
LARGER THAN THRESHOLD VALUE Thv1
PRIORITY 7 : CBR CLASS HAVING N COUNTER Nc VALUE SET TO 0, S COUNTER
Sc VALUE LARGER THAN 0 AND WAITING QUEUE LENGTH Qc
SMALLER THAN THRESHOLD VALUE Thc1
PRIORITY 8 : rt-VBR CLASS HAVING N COUNTER Ntv VALUE SET TO 0, S COUNTER
Stv VALUE LARGER THAN 0 AND WAITING QUEUE LENGTH Qtv
SMALLER THAN THRESHOLD VALUE Thtv1
PRIORITY 9 : nrt-VBR CLASS HAVING N COUNTER Nv VALUE SET TO 0, S COUNTER
Sv VALUE LARGER THAN 0 AND WAITING QUEUE LENGTH Qv
SMALLER THAN THRESHOLD VALUE Thv1
PRIORITY 10 : ABR CLASS HAVING SUM OF W COUNTER Wabr VALUE AND
S COUNTER Sabr VALUE LARGER THAN 0
PRIORITY 10 : UBR CLASS HAVING SUM OF W COUNTER Wubr VALUE AND
S COUNTER Subr VALUE LARGER THAN 0
PRIORITY 11: CBR CLASS HAVING BOTH VALUES OF N COUNTER Nc AND
S COUNTER Sc SET TO 0
PRIORITY 12: rt-VBR CLASS HAVING BOTH VALUES OF N COUNTER Ntv AND
S COUNTER Stv SET TO 0
PRIORITY 13: nrt-VBR CLASS HAVING BOTH VALUES OF N COUNTER Nv AND
S COUNTER Sv SET TO 0

THE WEIGHTED ROTATIONAL PRIORITY CONTROL IS EXECUTED AMONG CLASSES
AT THE SAME PRIORITY LEVEL.

FIG.12

PRIORITY 1 : CBR CLASS HAVING N COUNTER Nc VALUE LARGER THAN 0

PRIORITY 1 : rt-VBR CLASS HAVING N COUNTER Ntv VALUE LARGER THAN 0

PRIORITY 1 : nrt-VBR CLASS HAVING N COUNTER Nv VALUE LARGER THAN 0

PRIORITY 2 : CBR CLASS HAVING N COUNTER Nc VALUE SET TO 0, S COUNTER Sc VALUE LARGER THAN 0 AND WAITING QUEUE LENGTH Qc LARGER THAN THRESHOLD VALUE Thc1

PRIORITY 2 : rt-VBR CLASS HAVING N COUNTER Ntv VALUE SET TO 0, S COUNTER Stv VALUE LARGER THAN 0 AND WAITING QUEUE LENGTH Qtv LARGER THAN THRESHOLD VALUE Thtv1

PRIORITY 2 : nrt-VBR CLASS HAVING N COUNTER Nv VALUE SET TO 0, S COUNTER Sv VALUE LARGER THAN 0 AND WAITING QUEUE LENGTH Qv LARGER THAN THRESHOLD VALUE Thv1

PRIORITY 3 : CBR CLASS HAVING N COUNTER Nc VALUE SET TO 0, S COUNTER Sc VALUE LARGER THAN 0 AND WAITING QUEUE LENGTH Qc SMALLER THAN THRESHOLD VALUE Thc1

PRIORITY 3 : rt-VBR CLASS HAVING N COUNTER Ntv VALUE SET TO 0, S COUNTER Stv VALUE LARGER THAN 0 AND WAITING QUEUE LENGTH Qtv SMALLER THAN THRESHOLD VALUE Thtv1

PRIORITY 3 : nrt-VBR CLASS HAVING N COUNTER Nv VALUE SET TO 0, S COUNTER Sv VALUE LARGER THAN 0 AND WAITING QUEUE LENGTH Qv SMALLER THAN THRESHOLD VALUE Thv1

PRIORITY 4 : ABR CLASS HAVING SUM OF W COUNTER Wabr VALUE AND S COUNTER Sabr VALUE LARGER THAN 0

PRIORITY 4 : UBR CLASS HAVING SUM OF W COUNTER Wubr VALUE AND S COUNTER Subr VALUE LARGER THAN 0

PRIORITY 5 : CBR CLASS HAVING BOTH VALUES OF COUNTER Nc AND S COUNTER Sc SET TO 0

PRIORITY 5 : rt-VBR CLASS HAVING BOTH VALUES OF N COUNTER Ntv ND S COUNTER Stv SET TO 0

PRIORITY 5 : nrt-VBR CLASS HAVING BOTH VALUES OF N COUNTER Nv AND S COUNTER Sv SET TO 0

THE WEIGHTED ROTATIONAL PRIORITY CONTROL IS EXECUTED AMONG CLASSES AT THE SAME PRIORITY LEVEL.

AS FOR THE PRIORITY LEVELS 1 TO 3, THE VALUE CONFORMING TO THE GUARANTEED BANDWIDTH OF THE RESPECTIVE CLASSES IS USED AS THE WEIGHT.

FIG.14

PRIORITY 1 : CBR CLASS HAVING N COUNTER Nc VALUE LARGER THAN 0

PRIORITY 2 : rt-VBR CLASS HAVING N COUNTER Ntv VALUE LARGER THAN 0

PRIORITY 3 : nrt-VBR CLASS HAVING N COUNTER Nv VALUE LARGER THAN 0

PRIORITY 4 : CBR CLASS HAVING N COUNTER Nc VALUE SET TO 0, S COUNTER Sc VALUE LARGER THAN 0 AND WAITING QUEUE LENGTH Qc LARGER THAN THRESHOLD VALUE Thc1

PRIORITY 5 : rt-VBR CLASS HAVING N COUNTER Ntv VALUE SET TO 0, S COUNTER Stv VALUE LARGER THAN 0 AND WAITING QUEUE LENGTH Qtv LARGER THAN THRESHOLD VALUE Thtv1

PRIORITY 6 : nrt-VBR CLASS HAVING N COUNTER Nv VALUE SET TO 0, S COUNTER Sv VALUE LARGER THAN 0 AND WAITING QUEUE LENGTH Qv LARGER THAN THRESHOLD VALUE Thv1

PRIORITY 7 : CBR CLASS HAVING N COUNTER Nc VALUE SET TO 0, S COUNTER Sc VALUE LARGER THAN 0 AND WAITING QUEUE LENGTH Qc SMALLER THAN THRESHOLD VALUE Thc1

PRIORITY 8 : rt-VBR CLASS HAVING N COUNTER Ntv VALUE SET TO 0, S COUNTER Stv VALUE LARGER THAN 0 AND WAITING QUEUE LENGTH Qtv SMALLER THAN THRESHOLD VALUE Thtv1

PRIORITY 9 : nrt-VBR CLASS HAVING N COUNTER Nv VALUE SET TO 0, S COUNTER Sv VALUE LARGER THAN 0 AND WAITING QUEUE LENGTH Qv SMALLER THAN THRESHOLD VALUE Thv1

PRIORITY 10 : CBR CLASS HAVING BOTH VALUES OF N COUNTER Nc AND S COUNTER Sc SET TO 0 AND WAITING QUEUE LENGTH Qc LARGER THAN THRESHOLD VALUE Thc2

PRIORITY 11 : rt-VBR CLASS HAVING BOTH VALUES OF N COUNTER Ntv AND S COUNTER Stv SET TO 0 AND WAITING QUEUE LENGTH Qtv LARGER THAN THRESHOLD VALUE Thtv2

PRIORITY 12 : nrt-VBR CLASS HAVING BOTH VALUES OF N COUNTER Nv AND S COUNTER Sv SET TO 0 AND WAITING QUEUE LENGTH Qv LARGER THAN THRESHOLD VALUE Thv2

PRIORITY13 : ABR CLASS HAVING SUM OF W COUNTER Wabr VALUE AND S COUNTER Sabr VALUE LARGER THAN 0

PRIORITY13 : UBR CLASS HAVING SUM OF W COUNTER Wubr VALUE AND S COUNTER Subr VALUE LARGER THAN 0

PRIORITY 14 : CBR CLASS HAVING BOTH VALUES OF N COUNTER Nc AND S COUNTER Sc SET TO 0

PRIORITY 15 : rt-VBR CLASS HAVING BOTH VALUES OF N COUNTER Ntv AND S COUNTER Stv SET TO 0

PRIORITY 16 : nrt-VBR CLASS HAVING BOTH VALUES OF N COUNTER Nv AND S COUNTER Sv SET TO 0

THE WEIGHTED ROTATIONAL PRIORITY CONTROL IS EXECUTED AMONG CLASSES AT THE SAME PRIORITY LEVEL.

FIG.15

PRIORITY 1 : CBR CLASS HAVING N COUNTER Nc VALUE LARGER THAN 0

PRIORITY 1 : rt-VBR CLASS HAVING N COUNTER Ntv VALUE LARGER THAN 0

PRIORITY 1 : nrt-VBR CLASS HAVING N COUNTER Nv VALUE LARGER THAN 0

PRIORITY 2 : CBR CLASS HAVING N COUNTER Nc VALUE SET TO 0, S COUNTER Sc VALUE LARGER THAN 0 AND WAITING QUEUE LENGTH Qc LARGER THAN THRESHOLD VALUE Thc1

PRIORITY 2 : rt-VBR CLASS HAVING N COUNTER Ntv VALUE SET TO 0, S COUNTER Stv VALUE LARGER THAN 0 AND WAITING QUEUE LENGTH Qtv LARGER THAN THRESHOLD VALUE Thtv1

PRIORITY 2 : nrt-VBR CLASS HAVING N COUNTER Nv VALUE SET TO 0, S COUNTER Sv VALUE LARGER THAN 0 AND WAITING QUEUE LENGTH Qv LARGER THAN THRESHOLD VALUE Thv1

PRIORITY 3 : CBR CLASS HAVING N COUNTER Nc VALUE SET TO 0, S COUNTER Sc VALUE LARGER THAN 0 AND WAITING QUEUE LENGTH Qc SMALLER THAN THRESHOLD VALUE Thc1

PRIORITY 3 : rt-VBR CLASS HAVING N COUNTER Ntv VALUE SET TO 0, S COUNTER Stv VALUE LARGER THAN 0 AND WAITING QUEUE LENGTH Qtv SMALLER THAN THRESHOLD VALUE Thtv1

PRIORITY 3 : nrt-VBR CLASS HAVING N COUNTER Nv VALUE SET TO 0, S COUNTER Sv VALUE LARGER THAN 0 AND WAITING QUEUE LENGTH Qv SMALLER THAN THRESHOLD VALUE Thv1

PRIORITY 4 : CBR CLASS HAVING BOTH VALUES OF N COUNTER Nc AND S COUNTER Sc SET TO 0 AND WAITING QUEUE LENGTH Qc LARGER THAN THRESHOLD VALUE Thc2

PRIORITY 4 : rt-VBR CLASS HAVING BOTH VALUES OF N COUNTER Ntv AND S COUNTER Stv SET TO 0 AND WAITING QUEUE LENGTH Qtv LARGER THAN THRESHOLD VALUE Thtv2

PRIORITY 4 : nrt-VBR CLASS HAVING BOTH VALUES OF N COUNTER Nv AND S COUNTER Sv SET TO 0 AND WAITING QUEUE LENGTH Qv LARGER THAN THRESHOLD VALUE Thv2

PRIORITY 5 : ABR CLASS HAVING SUM OF W COUNTER Wabr VALUE AND S COUNTER Sabr VALUE LARGER THAN 0

PRIORITY 5 : UBR CLASS HAVING SUM OF W COUNTER Wubr VALUE AND S COUNTER Subr VALUE LARGER THAN 0

PRIORITY 6 : CBR CLASS HAVING BOTH VALUES OF N COUNTER Nc AND S COUNTER Sc SET TO 0

PRIORITY 6 : rt-VBR CLASS HAVING BOTH VALUES OF N COUNTER Ntv AND S COUNTER Stv SET TO 0

PRIORITY 6 : nrt-VBR CLASS HAVING BOTH VALUES OF N COUNTER Nv AND S COUNTER Sv SET TO 0

THE WEIGHTED ROTATIONAL PRIORITY CONTROL IS EXECUTED AMONG CLASSES AT THE SAME PRIORITY LEVEL.

AS FOR THE PRIORITY LEVELS 1,2,3,5 AND 6, THE VALUE CONFORMING TO THE GUARANTEED BANDWIDTH OF THE RESPECTIVE CBR CLASS, rt-VBR CLASS AND nrt-VBR CLASS IS USED AS THE WEIGHT.

FIG.16
PRIOR ART

| PRIORITY | COMMUNICATION QUALITY CLASS C1 | COMMUNICATION QUALITY CLASS C2 | COMMUNICATION QUALITY CLASS C3 |
|---|---|---|---|
| 1 | $Q1 > Th1$ | | |
| 2 | $Q1 \leq Th1$ | $Q1 > Th2$ | |
| 3 | | $Q2 \leq Th2$ | $Q3 > Th3$ |
| 4 | | | $Q3 \leq Th3$ |

ASYNCHRONOUS TRANSFER MODE EXCHANGE SYSTEM AND PRIORITY CONTROL METHOD

BACKGROUND OF THE PRESENT INVENTION

This invention relates to an Asynchronous Transfer Mode (referred to as ATM, hereinafter) exchange system used in a multimedia communication system employing a buffer memory. More specifically this invention relates to a priority control method which prevents an adverse influence caused by abnormal traffic generated in a certain communication quality class from being exerted on the rest of the classes.

The multimedia communication system employing the buffer memory provides services requiring communication quality with respect to characteristics such as real time processability, low destruction rate, "Best effort" transfer and the like. The following services have been provided such as Circuit Emulation; Constant Bit Rate Video service (referred to as CBR class) at a constant transmission bit rate requiring strict standards on delay or cell loss; Audio and visual service at a variable bit rate requiring real time processability (referred to as rt-VBR class); Data service at a variable bit rate requiring no real time processability (referred to as nrt-VBR class); a service at a variable bit rate requiring the best effort transfer and strict standards on cell loss (referred to as ABR class); a service requiring destruction and fairness at every cell (referred to as UBR class) and the like. A priority control method in such an ATM exchange system should be effective for simultaneously meeting the above-described different types of required communication quality.

In the conventional priority control method, an initial priority level is set for each communication quality class defined by the required communication quality. If a waiting queue length of each communication quality class is smaller than a threshold value specified with respect to the respective communication quality classes, priority control is executed according to the initial priority level. If a certain communication quality class has a waiting queue length equal to or larger than a threshold value, the priority level of the class is raised one level higher and the priority control will be executed according to the changed priority level. In case of those communication quality classes provided with the same priority, a rotational priority control is executed. The rotational priority control is done by outputting the cell from buffers of those classes one by one alternately. FIG. 16 shows a more detailed explanation of the above-described prior art. In FIG. 16, it is assumed that 3 classes are priority controlled.

An initial priority level is set for communication quality classes C1, C2 and C3, according to the communication quaility required by those classes. In FIG. 16, one or more of the priorities, 1, 2, 3 and 4 is assigned to the communication quality classes C1, C2 and C3. Threshold values Th1, Th2 and Th3 are also set for the communication quality classes C1, C2 and C3 according to the communication quality required by the classes C1, C2 and C3. When each of waiting queue length Q1, Q2 and Q3 of the communication quality classes C1, C2 and C3 is less than Th1, Th2 and Th3, respectively, the cell stored in a buffer B1 of the communication quality class C1 is output with the highest priority according to the initial priority level. A cell stored in a buffer B2 of the communication quality class C2 is output only when the buffer B1 stores no cells. A cell stored in a buffer B3 of the communication quality class C3 is output only when both buffers B1 and B2 store no cells.

If the waiting queue length Q2 exceeds the threshold value Th2 owing to increased traffic amount in a certain communication class, i.e., C2, the priority level of the communication quality class is changed from 3 to 2, thus changing the priority level of the classes C1, C2 and C3 to 2, 2 and 4, respectively. As a result, a rotational priority control is executed between the classes C1 and C2 at the same priority level. When the waiting queue length Q2 becomes equal to or smaller than the threshold value Th2, the priority level of the communication quality class C2 is restored to the original priority level of 3.

In the conventional priority control method, when the waiting queue length exceeds the threshold value due to increased traffic in a certain communication class, the priority level of the communication quality class is raised one level up. When the traffic amount is increased for some reason such that the waiting queue length exceeds the threshold value in a certain the communication quality class, communication quality of the other classes may be adversely influenced. For example, when the waiting queue length Q2 exceeds the threshold value Th2 due to the increased traffic in the communication quality class C2, the number of cells in the communication quality class C1 output in a unit of time is decreased, resulting in degraded communication quality. Now suppose that the waiting queue length Q3 of the communication quality class C3 now exceeds its threshold value Th3. Even though the priority level of the C3 is raised from 4 to 3, the priority of the class C2 has been set to 2 and cells are never output from the communication quality class C3 even if the buffer for the communication quality class C1 stores no cells.

SUMMARY OF THE INVENTION

It is an object of the present invention to prevent aforementioned problems.

It is another object of the present invention to provide a priority control method for preventing abnormal traffic generated in a certain communication quality class from exerting an adverse effect on the communication quality of any other communication quality classes. The above objects of the present invention are achieved by an ATM exchange system for receiving a plurality of calls each having different required communication quality comprising: a buffer for storing call cells belonging to each of a plurality of bandwidth demand classes that have been defined according to the required communication quality; a counter for each of said respective bandwidth demand classes; call reception control means for setting a guaranteed bandwidth represented by the number of cells per certain time required to be output to an output channel for assuring each communication quality of said respective bandwidth demand classes at said certain time interval; and priority control means for outputting cells stored in a buffer for a bandwidth demand class having a counter value not set to 0 to said output channel, subtracting 1 from a value set in a counter of a bandwidth demand class that has output cells at every output of cells to said output channel and outputting cells stored in a buffer for a bandwidth demand class having a counter value 0.

In a counter for every band width demand class, a call reception control means sets a guaranteed bandwidth represented by the number of cells per a certain time required to be output for assuring communication quality of the respective bandwidth demand classes at a certain time interval. A value of the counter of each band bandwidth class is subjected to subtraction through a priority control process means at every output of the cell from the corresponding bandwidth demand class buffer.

The priority control process means outputs the cell from the buffer for the bandwidth demand class in which the N counter value has not reached 0 and outputs the cell stored in the bandwidth demand class outputting the cell with the highest priority. The number of cells required to assure the communication quality of each bandwidth demand classes is output.

BRIEF DESCRIPTION OF THE DRAWINGS

This and other objects, features and advantages of the present invention will become more apparent upon a reading of the following detailed description and drawings, in which:

FIG. 4 is a flowchart showing a procedure executed by a priority control process circuit 2;

FIG. 5 is an example of priority levels used by the priority control process circuit 2;

FIG. 6 is an another example of priority levels used by the priority control process circuit 2;

FIG. 8 is an example of priority levels used by a priority control process circuit 12;

FIG. 9 is another example of priority levels used by the priority control process circuit 12;

FIG. 11 is an example of priority levels used by a priority control process circuit 22;

FIG. 12 is another example of priority levels used by the priority control process circuit 22;

FIG. 14 is an example of priority levels used by a priority control process circuit 32;

FIG. 15 is another example of priority levels used by the priority control process circuit 32; and FIG. 16 is an explanatory view of a prior art system.

EMBODIMENT

Figure 1:
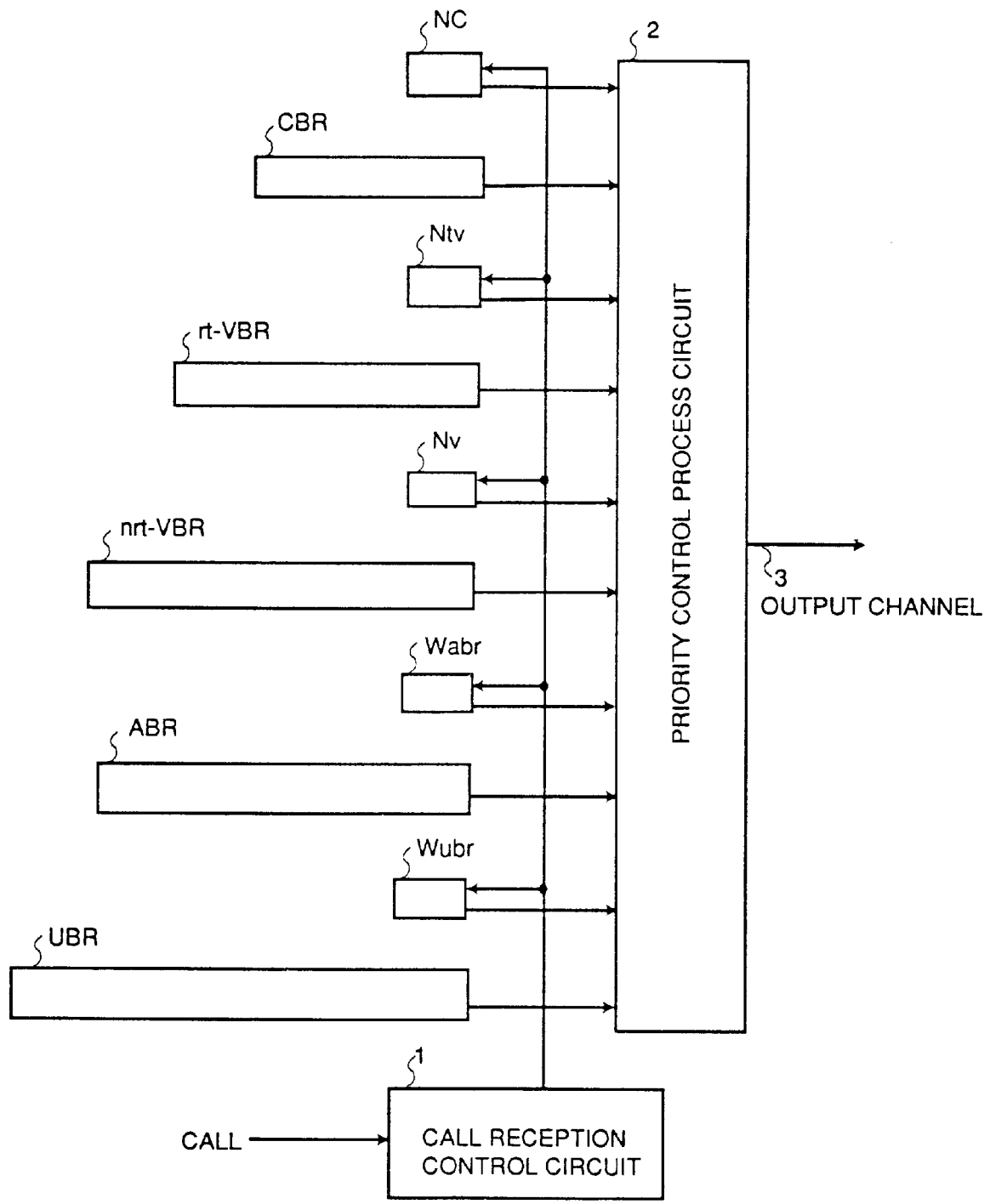
FIG. 1 is a block diagram of the structure of an embodiment of the present invention.

An embodiment of the present invention is described in detail referring to the drawings.

FIG. 1 is a block diagram of an embodiment of the present invention comprising a call reception control circuit 1, a priority control process circuit 2, an output channel 3, a bandwidth demand class buffers CBR, rt-VBR, nrt-VBR, best effort transfer demand class buffers ABR and UBR, N counters (Nc, Ntv and Nv) and W counters (Wabr and Wubr).

The bandwidth demand class buffers CBR, rt-VBR and nrt-VBR store the cells related to the calls belonging to the corresponding CBR class, rt-VBR class and nrt-VBR class resulting from classifying the call for bandwidth demand according to the required communication quality.

The best effort transfer demand class buffers ABR and UBR store the cells related to the calls belonging to the corresponding best effort class ABR class and UBR class resulting from classifying the call for the best effort transfer demand to use the remaining bandwidth according to the required communication quality.

The N counters Nc, Ntv and Nv are provided for the CBR class, rt-VBR class and nrt-VBR class, respectively. The W counters Wabr and Wubr are provided for the ABR class and the UBR class, respectively.

The call reception control circuit 1 has various functions for setting a guaranteed bandwidth represented by the number of cells per certain time Ts which is required to be output to the output channel 3. The circuit assures the communication quality of the CBR class, rt-VBR class, nrt-VBR class, rt-VBR class and nrt-VBR class. The call reception control circuit 1 also performs the function of setting values defined by a ratio of the ABR class and UBR class to use the remaining bandwidth represented by the number of cells output to the output channel 3 per certain time. The remaining bandwidth is determined by subtracting the guaranteed bandwidths for the CBR class, rt-VBR class and nrt-VBR class from the whole bandwidth in the W counter Wabr and Wubr when at least one of the Wabr or Wubr has a value set to 0 and both the ABR class and the UBR class are suspended (The value of the W counter, either Wabr or Wubr, is 0 or best effort transfer demand class buffers ABR and UBR are empty.).

The priority control process circuit 2 has functions for outputting cells stored in buffers CBR, rt-VBR, nrt-VBR, ABR and UBR to the output channel 3 according to the priority level defined by each value of the N counters Nc, Ntv, Nv and the W counters Wabr, Wubr and the respective class. The priority control process circuit 2 also performs the function of subtracting 1 from the value of the N counter Nc, Ntv and Nv or the W counters Wabr and Wubr not set to 0 for the class which is outputting the cell.

Figure 2:
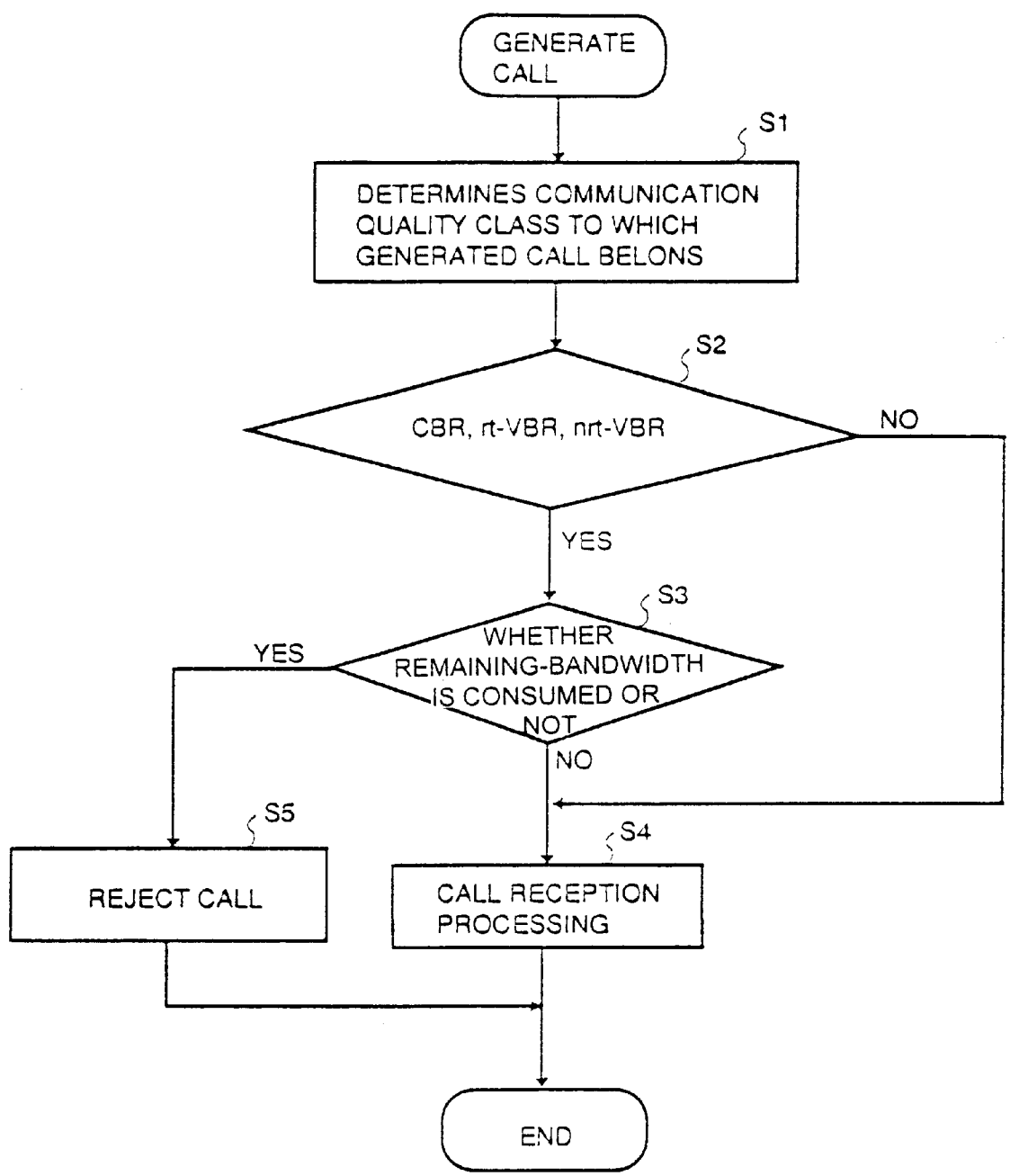
FIG. 2 is a flowchart showing a process of a call reception control circuit 1 upon generation of the call.
Figure 3:
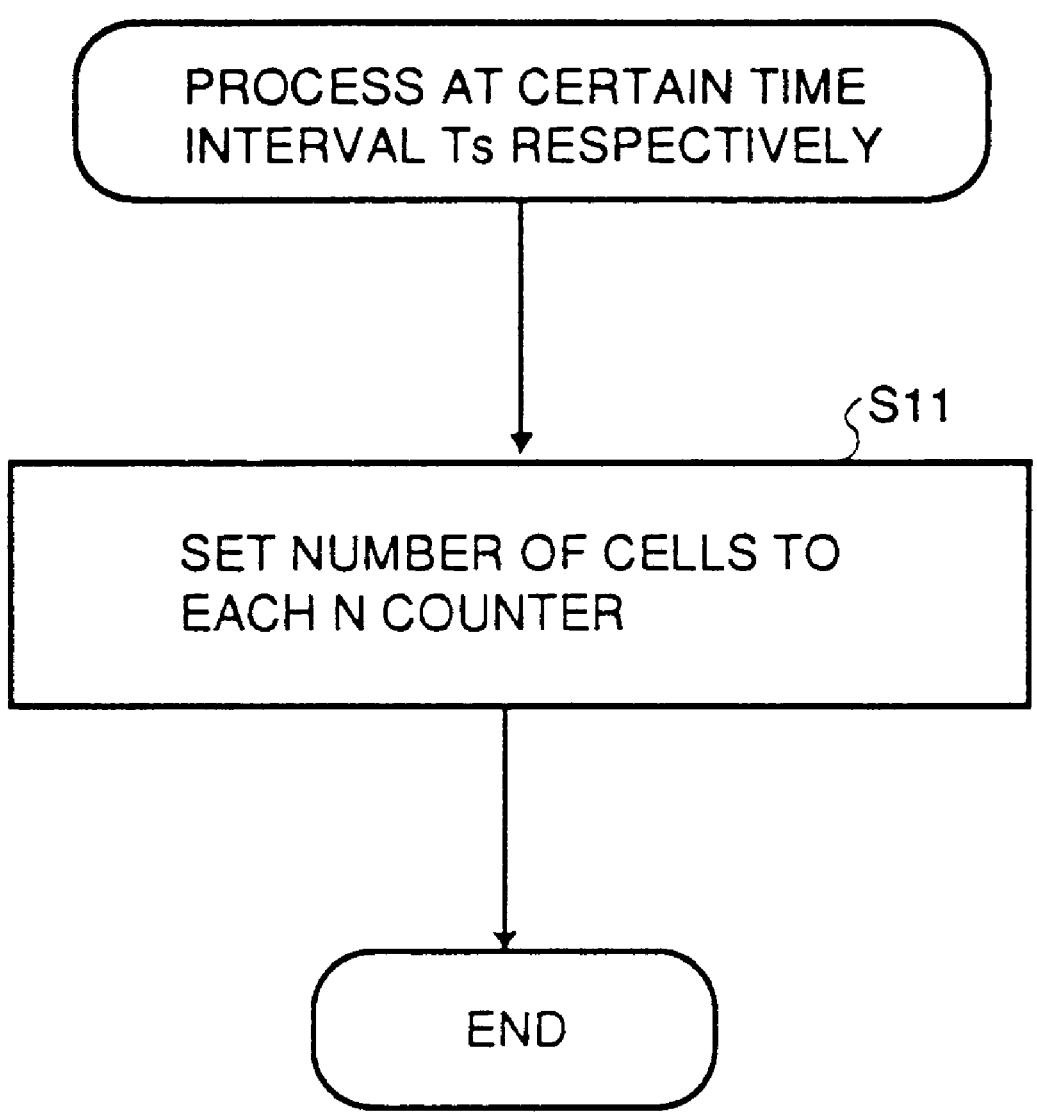
FIG. 3 is a flowchart showing a procedure executed by the call reception control circuit 1 for setting the N counter at a certain time interval Ts.

FIGS. 2 and 3 are flowcharts representing an example of the processing performed in the call reception control circuit 1. FIG. 4 is a flowchart representing an example of the processing performed in the priority control process circuit 2. The operation of the embodiment is hereinafter described with reference to the drawings.

As shown in the flowchart of FIG. 2, upon generation of a call, the call reception control circuit 1 determines the class to which the generated call belongs step (S1). When the call is determined to belong to any of the CBR class, rt-VBR class or nrt-VBR class for bandwidth demand, it is further determined whether or not the call results in consuming the remaining bandwidth steps (S2 and S3).

If it is determined that the remaining bandwidth is consumed, the call is rejected (If YES at S3, the process proceeds to S5). While if it is determined that the remaining bandwidth is not consumed, the call is received (If NO at S3, the process proceeds to S4). In step S4, the call reception control circuit 1 increases the guaranteed bandwidth for the class to which the received call belongs (CBR class, rt-VBR class or nrt-VBR class) by the value corresponding to the communication quality required by the received call as well as decreasing the value equal to the increment from the remaining bandwidth. Even if the cell transmission source transmits cells at a constant bit rate, those cells do not always reach an exchange office side at the above-described bit rate due to the influence of switches and the like. Accordingly the guaranteed bandwidth is set to be wider than that logically obtained. At the end of the call, the call reception control circuit 1 decreases the guaranteed bandwidth for the terminated call by a value corresponding to the communication demand quality of the call as well as increasing the remaining bandwidth by the value equal to the above-described decrement.

When it is determined that the call belongs to the ABR class or UBR class (If NO at S2), the call reception control circuit 1 executes the process at S4.

As shown in FIG. 3, when an ABR or UBR class call is received, the call reception control circuit 1 sets each guaranteed bandwidth of the CBR class, rt-VBR class and nrt-VBR class under control to the corresponding N counters Nc, Ntv and Nv, respectively at a certain time interval Ts (step S11).

The call reception control circuit 1 sets values defined by a ratio of the W counter Wabr and Wubr to use the remaining bandwidth in case at least one of either Wabr or Wubr has a count value 0 and both ABR class and UBR class are suspended.

As shown in FIG. 4, the priority control process circuit 2 outputs one cell according to the priority level shown in FIG. 5. When the counter value of the class outputting the cell is not 0, the processing for subtracting 1 from the counter value is repeatedly executed steps (S21 and S22).

The following process is executed at a certain time interval Ts by outputting the cell according to the priority level shown in FIG. 5. That is, a cell is output from the bandwidth demand class buffer CBR until the value of the N counter Nc of the CBR class becomes 0 or the bandwidth demand class buffer CBR becomes empty (in case of number of cells stored in the buffer CBR less than the N counter Nc value) (priority 1). Next, a cell is output from the bandwidth demand class buffer rt-VBR until the value of the N counter Ntv of the rt-VBR class becomes 0 or the bandwidth demand class buffer rt-VBR becomes empty (in case of number of cells stored in the buffer rt-VBR less than the N counter Ntv value) (priority 2). A cell is output from the bandwidth demand class buffer nrt-VBR until the value of the N counter Nv of the nrt-VBR class becomes 0 or the bandwidth demand class buffer nrt-VBR becomes empty (in case of number of cells stored in the buffer nrt-VBR less than the N counter Nv value) (priority 3). The number of cells required for assuring each communication quality of the CBR class, rt-VBR class and nrt-VBR class are preferentially output from the bandwidth demand class buffers CBR, rt-VBR and nrt-VBR, respectively.

The cells stored in the best effort transfer demand class buffers ABR and UBR for the ABR class and UBR class are output to the output channel 3 through weighted rotational priority control (Priority 4). The weighted rotational priority operates by outputting cells from the respective buffers according to a predetermined ratio. For example, suppose that the weighted rotational priority control is executed between the ABR class and UBR class in the ratio of 2:1 cells are output from the best effort transfer demand class buffer ABR for the ABR class. While one cell is output from the best effort transfer demand class buffer UBR for the UBR class. In the above case, the ABR class has better delay characteristics than those of the UBR class.

Then cells stored in the band width demand class buffers CBR, rt-VBR and nrt-VBR for the CBR class, rt-VBR class and nrt-VBR class, having the value of the N counter Nc, Nt and Nv set to 0 are output to the output channel 3 (Priority level 5 to 7). If a cell in a class having a higher priority than those of the class outputting a cell is generated, the higher priority class buffer preferentially outputs the cell.

The number of cells required for assuring communication quality of the CBR class, rt-VBR class and nrt-VBR class is output from the bandwidth demand class buffers CBR, rt-VBR and nrt-VBR, respectively at a certain time interval Ts. Therefore even if the abnormal traffic is generated in a certain bandwidth demand class among those CBR class, rt-VBR class and nrt-VBR class, communication quality of the rest of the bandwidth demand classes are guaranteed.

When using the priority level shown in FIG. 5, the delay characteristic of the higher priority class influences the lower priority class (especially in view of delay fluctuation). Priority levels shown in FIG. 6 can be used for reducing the aforementioned adverse influence.

Figure 7:
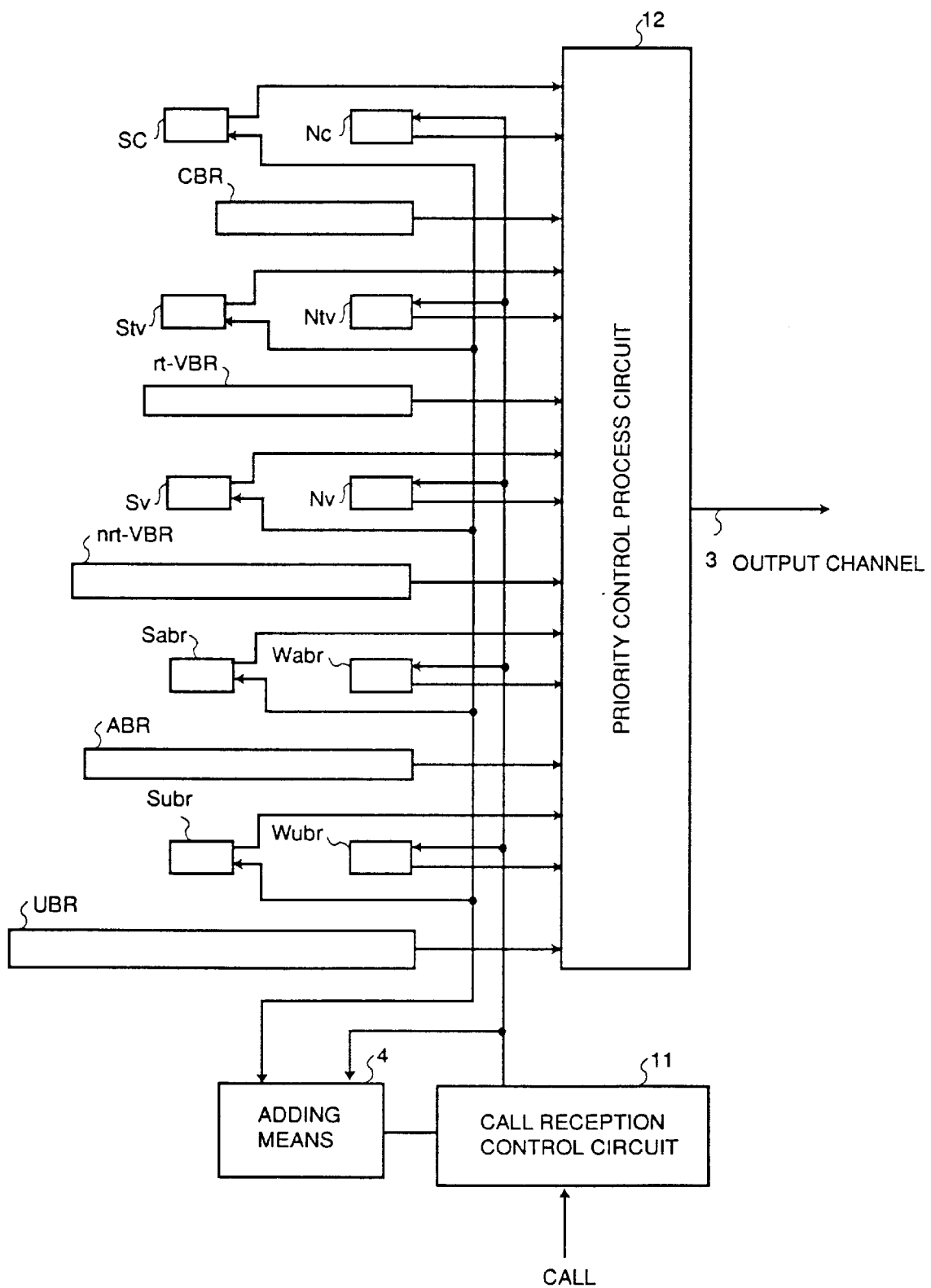
FIG. 7 is a block diagram of the structure of another embodiment of the present invention.

FIG. 7 is a block diagram of another embodiment of the present invention. This embodiment is constructed by adding addition means 4, S counters Sc, Stv, Sv, Sabr and Subr for the CBR class, rt-VBR class, nrt-VBR class, ABR class and UBR class, respectively, to the construction of the embodiment shown in FIG. 1. Additionally a call reception control circuit 11 and a priority control process circuit 12 are provided in place of the call reception control circuit 1 and the priority control process circuit 2 of the embodiment shown in FIG. 1.

The call reception control circuit 11 has a similar construction to that of the call reception control circuit 1 of FIG. 1. The call reception control circuit 1 of FIG. 1 sets a value larger than the logically obtained guaranteed bandwidth in the N counter Nc, Ntv and Nv. On the contrary, the call reception control circuit 11 sets the logically obtained guaranteed bandwidth in each of the N counter Nc, Ntv and Nv. The priority control process circuit 12 has the following functions: for outputting cells to the output channel 3 according to the priority level defined by each of the value of the N counters Nc, Ntv, Nv, the W counters of Wabr, Wubr, the S counters Sc, Stv, Sv, Sabr, Subr and the CBR class, rt-VBR class, nrt-VBR class, ABR class and UBR class;

for subtracting the value one from the value of the N counter Nc, Ntv and Nv not set to 0 in the class outputting the cell when the cell is output from the CBR class, rt-VBR class and nrt-VBR class for subtracting the value one from the value of the W counter Wabr and Wubr not set to 0 in the class outputting the cell when the cell is output from the ABR class and UBR class for subtracting the value one from the value of the S counter Sc, Stv and Sv not set to 0 in the class outputting the cell when the cell is output from the CBR class, rt-VBR class and nrt-VBR class having the value of the N counter Nc, Ntv and Nv set to 0; and for subtracting the value one from the value of the S counter Sabr and Subr not set to 0 in the class outputting the cell when the cell is output from the ABR class or UBR class having the value of the W counter Wabr and Wubr set to 0.

The addition means 4 has the following functions for: setting values (Sc+Nc), (Stv+Ntv) and (Sv+Nv) obtained by adding each value set in the S counters Sc, Stv and Sv to each value set in the N counter Nc, Ntv and Nv, respectively before setting the guaranteed bandwidth in the N counters Nc, Ntv and Nv through the call reception control circuit 11; and setting values (Sabr+Wabr) and (Subr+Wubr) obtained by adding each value set in the S counter Sabr and Subr to the value set in the W counters Wabr and Wubr in the S counter Sabr and Subr, respectively just before setting the value in the W counters Wabr and Wubr through the call reception control circuit 11.

Operations of the present embodiment of this invention shown in FIG. 7 are described.

Responding to a call, the call reception control circuit 11 executes the same processes shown in the flowchart of FIG. 2. The call reception control circuit 11 sets the guaranteed bandwidth in each of the N counters Nc, Ntv and Nv and in the W counters Wabr and Wubr, respectively in a similar way.

The addition means 4 determines the sums (Sc+Nc), (Stv+Ntv) and (Sv+Nv) by adding each value set in the S counter Sc, Stv and Sv to the value set in the N counter Nc, Ntv and Nv. The above sums are set in the S counters Sc, Stv and Sv, respectively just before setting the guaranteed bandwidth in the N counters Nc, Ntv and Nv through the call reception control circuit 11. The addition means 4 also determines the values (Sabr+Wabr) and (Subr+Wubr) by adding each value set in the S counters Sabr and Subr to the value set in the W counters Wabr and Wubr, respectively just before setting the value in the W counter Wabr and Wubr through the call reception control circuit 11.

The priority control process circuit 12 outputs one cell according to the priority level shown in FIG. 8. When the CBR class, rt-VBR class and nrt-VBR class having a value of the N counter Nc, Ntv and Nv larger than 0 outputs the cell, the value 1 is subtracted from the value of the N counter Nc, Ntv or Nv corresponding to the class outputting the cell. When the ABR class and UBR class having the value of the W counter Wabr and Wubr larger than 0 outputs the cell, the value 1 is subtracted from the value of the W counter Wabr or Wubr corresponding to the class outputting the cell. When the CBR class, rt-VBR class and nrt-VBR class having the value of the N counter Nc, Ntv and Nv set to 0 outputs the cell, the value 1 is subtracted from the value of the S counter Sc, Stv or Sv corresponding to the class outputting the cell. When the ABR class and UBR class having the value of the W counter Wabr and Wubr set to 0 outputs the cell, the value 1 is subtracted from the value of the S counter Sabr or Subr corresponding to the class outputting the cell.

By outputting the cell according to the priority level shown in FIG. 8, the following process is executed at a certain time interval Ts. First the bandwidth demand class buffer CBR outputs cells until the value of the N counter Nc of the CBR class is set to 0 or the bandwidth demand class buffer CBR becomes empty (in case of number of cells stored in the buffer CBR less than the N counter Nc value) (Priority 1). Next the bandwidth demand class buffer rt-VBR outputs cells until the value of the N counter Ntv of the rt-VBR class is set to 0 or the band width demand class buffer rt-VBR becomes empty (in case of number of cells stored in the buffer rt-VBR less than the N counter Ntv value) (Priority 2). The bandwidth demand class buffer nrt-VBR then outputs cells until the value of the N counter Nv of the nrt-VBR class is set to 0 or the bandwidth demand class buffer nrt-VBR becomes empty (in case of number of cells stored in the buffer nrt-VBR less than the N counter Nv value) (Priority 3).

The bandwidth demand class buffer CBR outputs cells until the value of the S counter Sc is set to 0 or the bandwidth demand class buffer CBR becomes empty (in case of number of cells stored in the buffer CBR less than the S counter Sc value) (Priority 4). The bandwidth demand class buffer rt-VBR outputs cells until the value of the S counter Stv is set to 0 or the bandwidth demand class buffer rt-VBR becomes empty (in case of number of cells stored in the buffer rt-VBR less than the S counter Stv value) (Priority 5). The bandwidth demand class buffer nrt-VBR outputs cells until the value of the S counter Sv is set to 0 or the bandwidth demand class buffer nrt-VBR becomes empty (in case of number of cells stored in buffer nrt-VBR less than the S counter Sv value) (Priority 6).

The cells stored in the best effort transfer demand class buffers ABR and UBR for the ABR class and the UBR class are output to the output channel 3 through the weighted rotational priority control (Priority 7).

The cells stored in the bandwidth demand class buffers CBR, rt-VBR and nrt-VBR for the CBR class, rt-VBR class and nrt-VBR class having both values of the N counter Nc, Ntv and Nv and the S counter Sc, Stv and Sv set to 0 are output to the output channel 3 (Priority 8 to 10). In case the class having a higher priority than those of classes outputting cells according to the given priority level is generated, the higher priority class buffer preferentially outputs the cell.

The present invention sets a higher priority to the CBR class, rt-VBR class and nrt-VBR class having the value of the N counter Nc, Ntv and Nv larger than 0 over the CBR class, rt-VBR class and nrt-VBR class having the value of the S counters Sc, Stv and Sv larger than 0. The following is the reason why the above-described priority setting has been defined.

Even if the cell transmission source transmits the cell at a constant bit rate, the cells do not always reach the exchange office at the above-specified bit rate. For example, supposing that the cell transmission source outputs 1000 cells per certain time Ts, it is often the case that only 900 cells reach within the certain time Ts and then in the next time Ts, 1100 cells reach.

It is assumed that a logically guaranteed bandwidth for assuring the communication quality is set to 1000 cell/Ts and only 900 cells are output in the first certain time interval Ts, then 1100 cells are output in the next certain time Ts to the bandwidth demand class buffer CBR for the CBR class.

In the above case, the N counter Nc has the guaranteed band width set to 1000 cells at a certain time interval Ts. When only 900 cells have reached at the certain time interval Ts, the N counter Nc is not set to 0 but to 100 even though all the cells stored in the bandwidth demand class buffer CBR are output. The Nc value 100 is added to the value currently set in the S counter Sc. For example, the Sc value is changed from 0 to 100.

When 1100 cells have reached at the subsequent time interval Ts, 1000 cells are output from the bandwidth demand class buffer CBR until the N counter Nc value is set to 0. Cells of the rt-VBR class and nrt-VBR class having the value of the N counter Ntv and Nv larger than 0 are output from the bandwidth demand class buffers rt-VBR and nrt-VBR. As the value of the S counter Sc has been set to 100, 100 cells left in the bandwidth demand class buffer CBR are output. As a result, 1100 cells are then output in this time interval Ts. Therefore 2000 cells can be output within 2 consecutive time intervals Ts, meeting the requirement of the guaranteed bandwidth, i.e., 1000 cells/Ts.

In the embodiment shown in FIG. 1, supposing that 1000 cells/Ts is set as the guaranteed band width in the N counter Nc, if only 900 cells have reached at a certain time interval Ts, 900 cells are output. When 1100 cells have reached at the next time interval Ts, 1000 cells are output. Therefore only 1900 cells in total are output within 2 consecutive time intervals Ts, failing to meet the requirement of the guaranteed band width, i.e., 1000 cells/Ts. In the embodiment of FIG. 1, the guaranteed bandwidth value therefore has to be larger than 1000 cells/Ts (for example, 1100 cells/Ts).

In this embodiment, the guaranteed bandwidth for assuring the same communication quality can be reduced compared with the embodiment of FIG. 1. As a result, the number of received calls can be increased compared with the embodiment of FIG. 1. That is in case a total of each guaranteed bandwidth of the CBR class, rt-VBR class and nrt-VBR class becomes larger than the whole bandwidth of the output channel 3, the call has to be rejected. When the guaranteed bandwidth is reduced, the number of calls for reception can be increased.

In the aforementioned embodiment, the priority level shown in FIG. 9 can be used in place of the priority level shown in FIG. 8 for preventing the higher priority class from giving an adverse effect on the lower priority class.

Figure 10:
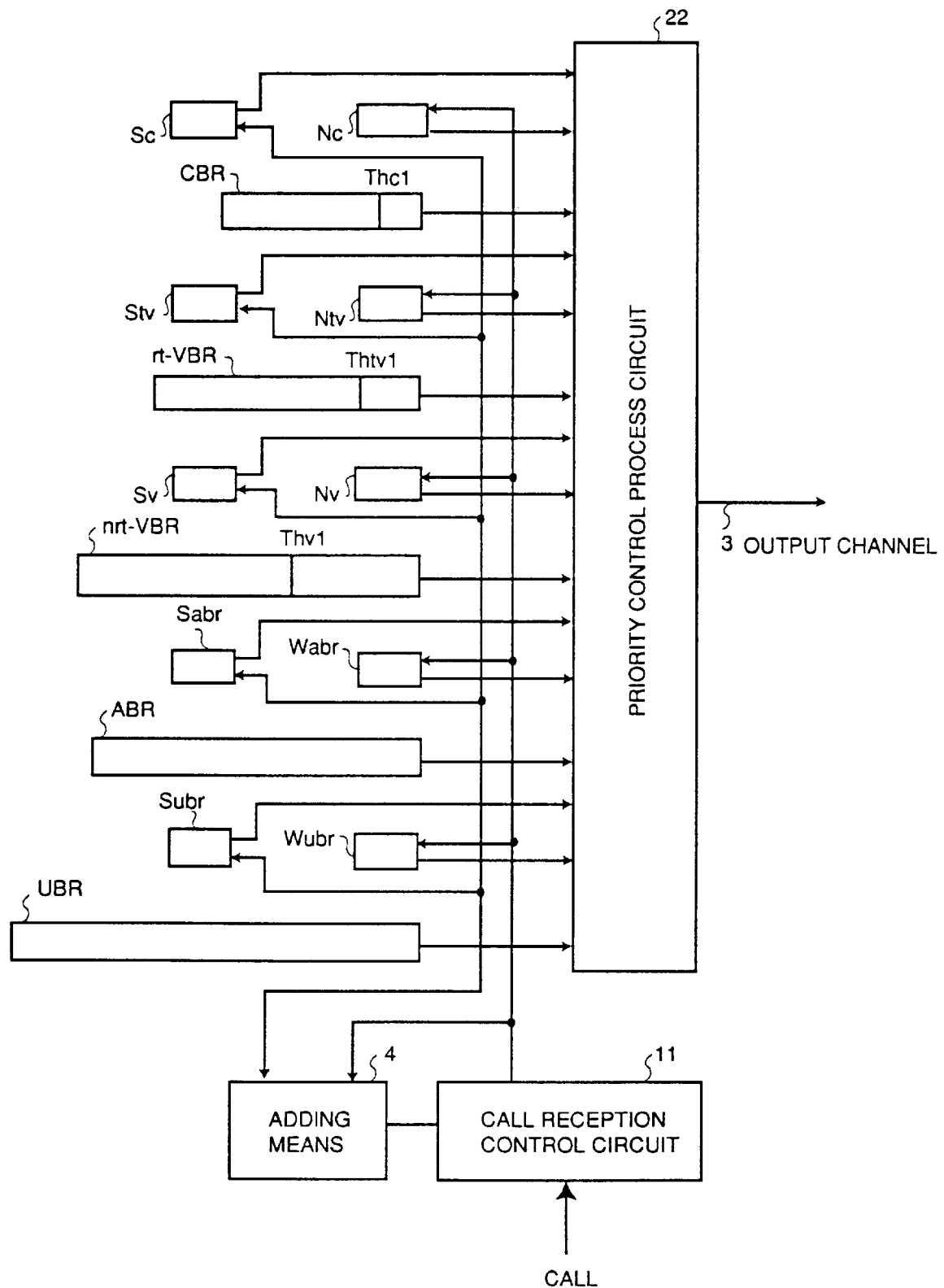
FIG. 10 is a block diagram of the structure of a further of the present invention.

FIG. 10 is a block diagram of other embodiment of the present invention. In this embodiment, a priority control process circuit 22 is used in place of the priority control process circuit 12 shown in FIG. 7.

The priority control process circuit 22 outputs cells to the output channel 3 according to the priority defined by each value of the N counters Nc, Ntv and Nv, the W counters Wabr and Wubr, the S counters Sc, Stv, Sv, Sabr and Subr, the CBR class, rt-VBR class, nrt-VBR class, ABR class and UBR class and each of the first threshold values of Thc1, Thtv1 and Thv1 for the respective CBR class, rt-VBR class and nrt-VBR class. Other functions of the priority control process circuit 22 are the same as those of the priority control process circuit 12 shown in FIG. 7.

The threshold values Thc1, Thtv1 and Thv1 correspond to the number of cells (waiting queue length Qc, Qtv and Qv) stored in the respective bandwidth demand class buffers CBR, rt-VBR and nrt-VBR. Those threshold values are set conforming to the communication quality required by each of the CBR class, rt-VBR class and nrt-VBR class.

Operations of this embodiment shown in FIG. 10 are explained.

The call reception control circuit 11 and addition means 4 execute the same processing as aforementioned.

The priority control process circuit 22 outputs one cell according to the priority level shown in FIG. 11. When the CBR class, rt-VBR class and nrt-VBR class having the value of the N counter Nc, Ntv and Nv larger than 0 outputs the cell, the value 1 is subtracted from the value of the N counter Nc, Ntv and Nv not set to 0 for the class outputting the cell. When the ABR class and UBR class having the value of the W counter Wabr and Wubr larger than 0 outputs the cell, the value 1 is subtracted from the value of the W counter Wabr and Wubr not set to 0 for the class outputting the cell. When the CBR class, rt-VBR class and nrt-VBR class having the value of the N counter Nc, Ntv and Nv set to 0 outputs the cell, the value 1 is subtracted from the value of the S counter Sc, Stv and Sv not set to 0 for the class outputting the cell. When the ABR class and UBR class having the value of the W counter Wabr and Wubr set to 0 outputs the cell, the value 1 is subtracted from the value of the S counter Sabr and Subr not set to 0 for the class outputting the cell.

By outputting cells according to the priority level shown in FIG. 11, the following process is executed at a certain time interval Ts. First, cells are output from the bandwidth demand class buffers CBR, rt-VBR and nrt-VBR for the CBR class, rt-VBR class and nrt-VBR class having the value of the N counter Nc, Ntv and Nv larger than 0 (Priority levels 1 to 3).

Cells are then output from the bandwidth demand class buffers CBR, rt-VBR and nrt-VBR for the CBR class, rt-VBR class and nrt-VBR class having the value of the S counter Sc, Stv and Sv larger than 0 and the waiting queue length Qc, Qtv and Qv larger than the threshold value Thc1, Thtv1 and Thv1, respectively (Priority levels 4 to 6).

Cells are then output from the bandwidth demand class buffers CBR, rt-VBR, nrt-VBR for the CBR class, rt-VBR class and nrt-VBR class having the value of the S counter Sc, Stv and Sv larger than 0 and the waiting queue length Qc, Qtv and Qv is smaller than the threshold value Thc1, Thtv1 and Thv1, respectively (Priority level 7 to 9).

The cells stored in the best effort transfer demand class buffers ABR and UBR for the ABR class and UBR class are output to the output channel 3 through the weighted rotational priority control (Priority level 10).

Finally cells stored in the bandwidth demand class buffers CBR, rt-VBR and nrt-VBR for the CBR class, rt-VBR class and nrt-VBR class having both values of the N counter Nc, Ntv and Nv and the S counter Sc, Stv and Sv set to 0 are output to the output channel 3 (Priority levels 11 to 13). In case a class having higher priority than those of the class outputting the cell according to the given priority level is generated, the higher priority class buffer preferentially outputs the cell.

The highest priority is given to the CBR class, rt-VBR class and nrt-VBR class having the value of the N counter Nc, Ntv and Nv larger than 0. The second highest priority is given to the CBR class, rt-VBR class and nrt-VBR class having the value of the S counter Sc, Stv and Sv larger than 0 and each having the waiting queue length Qc, Qtv and Qv larger than the first threshold value Thc1, Thtv1 and Thv1, respectively. Then the third priority is given to the CBR class, rt-VBR class and nrt-VBR class having the value of the S counter Sc, Stv and Sv larger than 0 and the waiting queue length Qc, Qtv and Qv smaller than the first threshold value Thc1, Thtv1 and Thv1, respectively. Therefore the communication quality of the CBR class, rt-VBR class and nrt-VBR class having the waiting queue length elongated due to abnormal traffic can be guaranteed, to some extent, without degrading the communication quality of other bandwidth demand classes.

The priority levels shown in FIG. 12 can be used in place of those shown in FIG. 11 for preventing the higher priority class from giving an adverse effect on the lower priority class.

Figure 13:
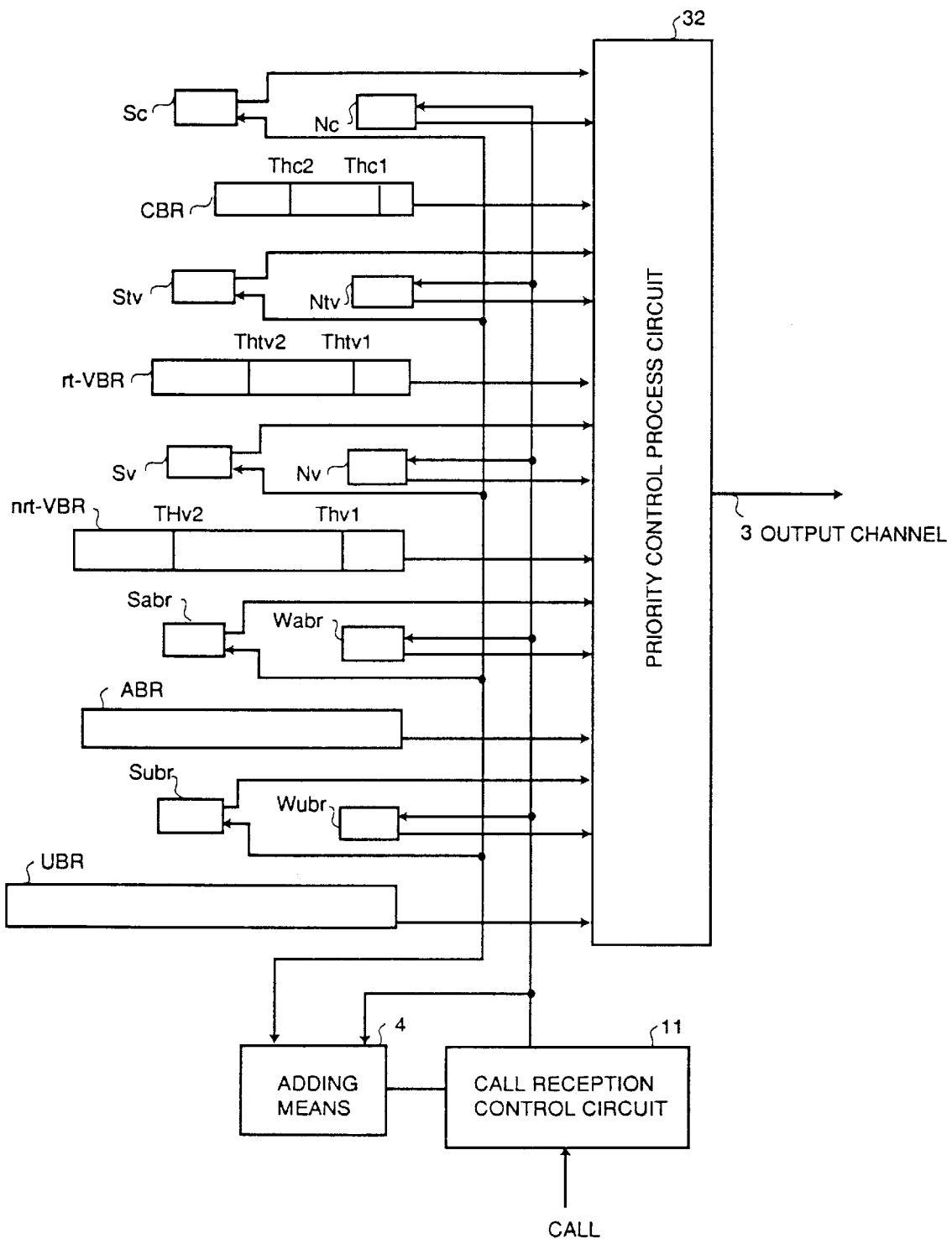
FIG. 13 is a block diagram of the structure of a still further embodiment of the present invention.

FIG. 13 is a block diagram of a still further embodiment of the present invention. This embodiment uses a priority control process circuit 32 in place of the priority control process circuit 22 shown in FIG. 10.

The priority control process circuit 32 outputs cells to the output channel 3 according to the priority level defined by each value of the N counters Nc, Ntv and Nv; W counters Wabr and Wubr; S counters Sc, Stv, Sv, Sabr and Subr; the CBR class, rt-VBR class, ABR class, UBR class; the first threshold value Thc1, Thtv1 and Thv1 for the CBR class, rt-VBR class and nrt-VBR class respectively; and the second threshold value Thc2, Thtv2 and Thv2 for the CBR class, rt-VBR class and nrt-VBR class, respectively. Other functions are the same as those of the priority control process circuit 22 shown in FIG. 10.

The threshold values Thc2, Thtv2 and Thv2 correspond to the waiting queue length Qc, Qtv and Qv for the CBR class, rt-VBR class and nrt-VBR class, respectively which are set in consideration of unexpected traffic.

Operations of this embodiment shown in FIG. 13 are explained.

The call reception control circuit 11 and the addition means 4 execute the same processing as aforementioned.

The priority control process circuit 32 outputs one cell according to the priority level shown in FIG. 14. When the CBR class, rt-VBR class and nrt-VBR class having the value of the N counter Nc, Ntv and Nv larger than 0 outputs the cells, the value 1 is subtracted from the value of the N counter Nc, Ntv and Nv not set to 0 for the class outputting the cell. When the ABR class and UBR class having the value of the W counter Wabr and Wubr larger than 0 outputs the cells, the value 1 is subtracted from the value of the W counter Wabr and Wubr not set to 0 for the class outputting the cell. When the CBR class, rt-VBR class and nrt-VBR class having the value of the N counter Nc, Ntv and Nv set to 0 outputs the cells, the value 1 is subtracted from the value of the S counter Sc, Stv and Sv not set to 0 for the class outputting the cell. When the ABR class and UBR class having the value of the W counter Wabr and Wubr set to 0 outputs the cells, the value 1 is subtracted from the value of the S counter Sabr and Subr not set to 0 for the class outputting the cell.

By outputting cells according to the priority levels shown in FIG. 14, the following process is executed at a certain time interval Ts. First, cells are output from the bandwidth demand class buffers CBR, rt-VBR and nrt-VBR for the CBR class, rt-VBR class and nrt-VBR class having the value of the N counter Nc, Ntv and Nv larger than 0 (Priority levels 1 to 3).

Cells are the output from the bandwidth demand class buffers CBR, rt-VBR and nrt-VBR for the CBR class, rt-VBR class and nrt-VBR class having the value of the S counter Sc, Stv and Sv larger than 0 and the waiting queue length Qc, Qtv and Qv larger than the threshold value Thc1, Thtv1 and Thv1, respectively (Priority levels 4 to 6).

Cells are then output from the bandwidth demand class buffers CBR, rt-VBR, nrt-VBR for the CBR class, rt-VBR class and nrt-VBR class having the value of the S counter Sc, Stv and Sv larger than 0 and the waiting queue length Qc, Qtv and Qv smaller than the threshold value Thc1, Thtv1 and Thv1, respectively (Priority levels 7 to 9).

Cells are then output from the bandwidth demand class buffers CBR, rt-VBR and nrt-VBR for the CBR class, rt-VBR class and nrt-VBR class having the value of the S counter Sc, Stv and Sv set to 0 and the waiting queue length Qc, Qtv and Qv larger than the second threshold value Thc2, Thtv2 and Thv2, respectively (Priority levels 10 to 12).

The cells stored in the best effort transfer demand class buffers ABR and UBR for the ABR class and the UBR class are output to the output channel 3 through the weighted rotational priority control (Priority level 13).

Finally cells stored in the bandwidth demand class buffers CBR, rt-VBR and nrt-VBR for the CBR class, rt-VBR class and nrt-VBR class having both values of the N counter Nc, Ntv and Nv and the S counter Sc, Stv and Sv set to 0 are output to the output channel 3 (Priority levels 14 to 16). In case the class having a higher priority than those of classes outputting the cell according to the given priority level, the higher priority class buffer preferentially outputs the cell.

The higher priority is given to the CBR class, rt-VBR class and nrt-VBR class having the value of the S counter Sc, Stv and Sv set to 0 and the waiting queue length Qc, Qtv and Qv larger than the second threshold value Thc2, Thtv2 and Thv2, respectively over the ABR class and the UBR class using the remaining bandwidth. As a result, in case an unexpected traffic is generated in a certain bandwidth demand class to which abnormally elongates the waiting queue length, the remaining bandwidth is available for the bandwidth demand class. Therefore communication quality of the bandwidth demand class having the unexpected traffic can be guaranteed, to a certain extent without degrading the communication quality of other bandwidth demand classes.

The priority level shown in FIG. 15 can be used in place of those shown in FIG. 14 for preventing the higher priority class from having an adverse effect on the lower priority class.

The present invention is provided with a call reception control circuit for setting in the N counter a guaranteed bandwidth represented by the number of cells per certain time required to be output for assuring the communication quality of the bandwidth demand class. The present invention also includes a priority control process circuit for outputting cells stored in the bandwidth demand class buffers for the respective bandwidth demand classes according to the priority levels. Priority is given to the bandwidth demand class having the value of the N counter not set to 0 over the bandwidth demand class having the value of the N counter set to 0. Even if abnormal traffic is generated in a certain bandwidth demand class, other bandwidth demand classes are allowed to output the number of cells set in the N counter required for assuring the communication quality. In spite of the abnormal traffic generated in the certain bandwidth demand class, the present invention allows the rest of the bandwidth demand classes to keep the communication quality.

The present invention is provided with a call reception control circuit for setting the guaranteed bandwidth in the N counter of the respective bandwidth demand classes as well as setting the value defined by the ratio of each W counter in the best effort classes to use the remaining bandwidth. The present invention further includes a priority control process circuit for outputting cells stored in the respective bandwidth demand class buffers and best effort transfer demand class buffers according to the priority levels. Priority is given to the bandwidth demand class having the value of the N counter not set to 0 over the bandwidth demand classes and the best effort classes having the value of the N counter set to 0. In the ATM exchange system accommodating calls of both the bandwidth demand classes and best effort classes, even if the abnormal traffic is generated in a certain bandwidth demand class, communication quality of the rest of the bandwidth demand classes can be protected from being deteriorated.

The present invention is provided with a priority control process circuit for outputting cells stored in the bandwidth demand class buffers and best effort transfer demand class buffers according to the priority level giving a higher priority to the bandwidth demand class having the value of the S counter containing the value of unused guaranteed bandwidth not set to 0 over the bandwidth demand class and best effort class having the value of the S counter set to 0. By use of the guaranteed bandwidth set in the N counter which has been logically obtained, the communication quality of the bandwidth demand class can be kept. Therefore the number of calls for reception and the usage of the output channel for the bandwidth demand class can be increased.

In the present invention, bandwidth demand classes at the same priority level are controlled by weighted rotational priority by using the guaranteed bandwidth of the respective band width demand class as the weight, thus further improving the delay characteristic.

The present invention outputs cells to the output channel according to the priority level giving a higher priority to the bandwidth demand class having the value of the S counter not set to 0 and the number of cells stored in its buffer equal to or larger than the first threshold value over the bandwidth demand classes and best effort classes having the value of the S counter not set to 0 and the number of cells stored in the band width demand class buffer smaller than the first threshold value. Therefore, abnormal traffic generated in a certain bandwidth demand class never gives an adverse effect on the other bandwidth demand classes, as well as guaranteeing the communication quality of the bandwidth demand class having the abnormality in the traffic.

The present invention outputs cells stored in the respective bandwidth demand class buffers and the best effort transfer demand class buffers according to the priority level giving a higher priority to the bandwidth demand class having the value of the S counter set to 0 and the number of cells stored in the bandwidth demand class buffer equal to or larger than the second threshold value over the best effort class. If the waiting queue length is elongated due to unexpected traffic generated in a certain bandwidth demand class, the bandwidth demand class is allowed to use the remaining bandwidth. As a result, the bandwidth demand class having the abnormality in traffic is able to keep its communication quality to a certain extent without causing an adverse effect on the communication quality of any other bandwidth demand classes.

What is claimed is:

1. An Asynchronous Transfer Mode (ATM), exchange system for receiving a plurality of calls each having different required communication quality, the system comprising:

a buffer for each of a plurality of respective bandwidth demand classes that have been defined according to the required communication quality, each buffer storing call cells belonging to one of said respective bandwidth demand classes;

a counter for each of said respective bandwidth demand classes;

call reception control means for setting in each counter a guaranteed bandwidth represented by a number of cells per certain time interval required to be output to an output channel for assuring the communication quality of each of said respective bandwidth demand classes at said certain time interval; and priority control means for outputting cells to said output channel, said cells being stored in said buffer corresponding to one of said bandwidth demand classes, said counter corresponding to said one of said bandwidth demand classes containing a value not set to zero (0), said priority control means further subtracting one (1) from said value set in said counter of said one of said bandwidth demand classes that has output cells and said priority control means further outputting cells stored in said buffer corresponding to another of said bandwidth demand classes having a corresponding counter containing a value of zero (0).

2. The ATM exchange system of claim 1, wherein said priority control means outputs cells stored in said buffer to said output channel according to a priority defined by said bandwidth demand classes.

3. The ATM exchange system of claim 1, wherein said call reception control means includes means for determining a bandwidth demand class to which a generated call belongs.

4. The ATM exchange system of claim 1, wherein said call reception control means further includes means for rejecting a call when receiving said call is expected to exhaust a remained bandwidth.

5. The ATM exchange system of claim 1, wherein said call reception control means includes means for setting a guaranteed bandwidth wider than a logically obtained guaranteed bandwidth in each counter.

6. An ATM exchange system for receiving a plurality of calls each having different required communication quality, said system comprising:

a first buffer storing call cells belonging to each of a plurality of respective bandwidth demand classes that have been defined according to said required communication quality;

first counter for each of said respective bandwidth demand classes;

a second buffer storing call cells belonging to each of a plurality of respective best effort classes that have been defined according to said required communication quality for best effort transfer;

a second counter for each of said respective best effort classes;

call reception control means for setting in each said first counter a guaranteed bandwidth represented by a number of cells per certain time required to be output to an output channel for assuring the communication quality of each of said respective bandwidth demand classes and said call reception control means further for setting in each said second counter values defined by a ratio of each of said respective best effort classes to each other, said respective best effort classes using a remaining bandwidth resulting from subtracting a guaranteed bandwidth dedicated to said bandwidth demand classes from a whole bandwidth of said output channel, said call reception control means setting in each said second counter when at least one said second counter has a count value of zero (0) and all best effort classes are in suspended status; and a priority control means for outputting cells stored either in said first buffer or said second buffer for one of said bandwidth demand classes or one of said best effort classes, respectively, having a counter value not set to zero (0), and for subtracting one (1) from said value of either said first counter or said second counter of said one of said bandwidth demand classes or said one of said best effort classes that has output a cell to said output channel, and said priority control means further outputting cells stored in said first buffer or said second buffer of another of said bandwidth demand classes or another of said best effort classes, respectively, having a counter value of zero (0).

7. The ATM exchange system of claim 6, wherein said priority control means outputs cells stored in said first buffer for said bandwidth demand classes with priority over cells stored in said second buffer for said best effort classes and, when outputting cells of said bandwidth demand classes, outputs cells according to a priority defined by said bandwidth demand classes.

8. The ATM exchange system of claim 6, wherein said suspended status represents that said second counter value is 0 or said second buffer has an empty area.

9. The ATM exchange system of claim 6, wherein said call reception control means includes means for determining a class to which a generated call belongs.

10. The ATM exchange system of claim 6, wherein said call reception control means includes means for rejecting a call when receiving said call is expected to exhaust a said remaining bandwidth.

11. The ATM exchange system of claim 6, wherein said call reception control means includes means for setting in each said first counter said guaranteed bandwidth wider than a logically obtained guaranteed bandwidth.

12. The ATM exchange system of claim 6, wherein said priority control means includes means for weighted rotational priority controlling bandwidth demand classes having the same priority using said guaranteed band width for each of said respective bandwidth demand classes as a weight.

13. An ATM exchange system for receiving a plurality of calls each having different required communication quality, said system comprising:

a first buffer storing call cells belonging to each of a plurality of respective bandwidth demand classes that have been defined according to said required communication quality;

a first counter for each of said respective bandwidth demand classes;

a second buffer storing call cells belonging to each of a plurality of respective best effort classes that have been defined according to said required communication quality for best effort transfer;

a second counter for each of said respective best effort classes;

a third counter for each of said respective bandwidth demand classes and said respective best effort classes;

call reception control means for setting in the first counter for each of said respective bandwidth demand classes a guaranteed bandwidth represented by a number of cells per certain time required to be output to an output channel for assuring the communication quality of each of said respective bandwidth demand classes and for setting in the second counter values defined by a ratio of each of said respective best effort classes to each other, said best effort classes using a remaining bandwidth resulting from subtracting said guaranteed bandwidth from a whole bandwidth of said output channel that is represented by said number of cells that can be output to said output channel within said certain time, said call reception control means setting in each said second counter when at least one said second counter has a count value of zero (0) and all best effort classes are in suspended status;

addition means for setting in the third counter for each of said respective bandwidth demand classes a value obtained by adding a count value of a respective first counter to a count value of a respective third counter just before setting said guaranteed bandwidth in said first counter, and said addition means further for setting in said third counter for each of said respective best effort classes a value obtained by adding a count value of a respective second counter to a count value of a respective third counter just before setting a value in said respective second counter; and priority control means for outputting to said output channel cells stored in said first buffer for one of said bandwidth demand classes having said value of said first counter not set to zero (0), for subtracting one (1) from said value of said first counter for said bandwidth demand classes that has output a cell, for outputting cells stored in said first buffer of another of said bandwidth demand classes having said value of said first counter set to zero (0) and said value of said third counter not set to zero (0), for subtracting one (1) from said value of said third counter of said another of said bandwidth demand classes that has output a cell, for outputting cells stored in said second buffer for one of said best effort classes having a value not equal to zero (0) obtained by adding said value of said second counter to said value of said third counter, for subtracting one (1) from a value of either said second counter or said third counter of said one of said best effort classes that has output a cell, and for outputting cells stored in said first buffer for a third one of said respective bandwidth demand classes having both values of said first counter and said third counter set to zero (0).

14. The ATM exchange system of claim 13, wherein cells of said bandwidth demand classes stored in said first buffer are output to said output channel according to a priority defined by said bandwidth demand classes.

15. The ATM exchange system of claim 13, wherein said suspended status represents that said second counter value is 0 or said second buffer has an empty area.

16. The ATM exchange system of claim 13, wherein said call reception control means includes means for determining a class to which a generated call belongs.

17. The ATM exchange system of claim 13, wherein said call reception control means includes means for rejecting a call when receiving said call is expected to exhaust a remained bandwidth.

18. The ATM exchange system of claim 13, wherein said call reception control means includes means for setting a logically obtained guaranteed bandwidth in said counters.

19. The ATM exchange system of claim 13, wherein said priority control means including means for weighted rotational priority controlling bandwidth demand classes having the same priority using said guaranteed band width for each of said respective bandwidth demand classes as a weight.

20. An ATM exchange system for receiving a plurality of calls each having different required communication quality, said system comprising:

a first buffer storing call cells belonging to each of a plurality of respective bandwidth demand classes that have been defined according to said required communication quality;

a first counter for each of said respective bandwidth demand classes;

a second buffer storing call cells belonging to each of a plurality of respective best effort classes that have been defined according to said required communication quality for best effort transfer;

a second counter for each of said respective best effort classes;

a third counter for each of said bandwidth demand classes and said best effort classes;

call reception control means for setting in the first counter for each of said respective bandwidth demand classes a guaranteed bandwidth represented by a number of cells per certain time required to be output to an output channel for assuring the communication quality of each of said respective bandwidth demand classes, and for setting in the second counter for each of said best effort classes values defined by a ratio of each of said respective best effort classes to each other, said best effort classes using a remaining bandwidth resulting from subtracting said guaranteed bandwidth from a whole bandwidth of said output channel that is represented by said number of cells that can be output to said output channel within said certain time, said call reception control means setting in each said second counter when at least one said second counter has a count value zero (0) and all best effort classes are in suspended status;

addition means for setting in said third counter for each of said respective bandwidth demand classes a value obtained by adding a count value of a respective first counter to a count value of a respective third counter just before setting said guaranteed bandwidth in said first counter, and for setting in said third counter for each of said respective best effort classes a value obtained by adding a count value of a respective second counter to a count value of a respective third counter just before setting a value in said respective second counter; and priority control means for outputting to said output channel cells stored in said first buffer for a first of said respective bandwidth demand classes having said value of said first counter not set to zero (0), for subtracting one (1) from said value of said first counter for said first of said respective bandwidth demand classes that has output a cell, for outputting cells stored in said first buffer for a second of said respective bandwidth demand classes having said value of said first counter set to zero (0), said value of said third counter not set to zero (0) and said number of cells stored in said first buffer equal to or larger than a first threshold value set with respect to a second of said respective bandwidth demand classes, for subtracting one (1) from said value of said third counter for said second of said respective bandwidth demand classes that has output a cell, for outputting cells stored in said first buffer of a third of said respective bandwidth demand classes having said value of said first counter set to zero (0), said value of said third counter not set to zero (0), said number of cells stored in said first buffer being smaller than said first threshold value set with respect to said third of said respective bandwidth demand classes, for subtracting one (1) from said value of said third counter for said third of said respective bandwidth demand classes that has output a cell, for outputting cells stored in said second buffer for one of said respective best effort classes having a value not equal to zero (0) obtained by adding said value of said second counter to said value of said third counter, and for subtracting one (1) from said value either of said second counter or said third counter for said respective one of said best effort classes that has output a cell, and for outputting cells stored in said buffer for a fourth one of said respective bandwidth demand classes having both values of said first counter and said third counter set to zero (0).

21. The ATM exchange system of claim 20, wherein cells of said respective bandwidth demand classes stored in said first buffer are output to said output channel according to a priority defined by said respective bandwidth demand classes.

22. The ATM exchange system of claim 20, wherein said suspended status represents that said second counter value is 0 or said second buffer has an empty area.

23. The ATM exchange system of claim 20, wherein said call reception control means includes means for determining a class to which a generated call belongs.

24. The ATM exchange system of claim 20, wherein said call reception control means includes means for rejecting a call when receiving said call is expected to exhaust said remaining bandwidth.

25. The ATM exchange system of claim 20, wherein said call reception control means includes means for setting a logically obtained guaranteed bandwidth in said first counters.

26. The ATM exchange system of claim 20, wherein said priority control means includes means for weighted rotational priority controlling bandwidth demand classes having the same priority using said guaranteed band width for each of said respective band width demand classes as a weight.

27. The ATM exchange system of claim 20, wherein said priority control means includes means for outputting cells stored in said first buffer for a fifth bandwidth demand class having said third counter value set to 0 and a number of cells larger than a second threshold value larger than said first threshold value that has been set with respect to said fifth bandwidth demand class.

28. A priority control method for an ATM exchange system for receiving a plurality of calls each having different respective required communication quality, said method comprising the steps of:

setting a plurality of bandwidth demand classes according to said respective required communication quality;

setting in respective counter corresponding to each of said bandwidth demand classes a guaranteed bandwidth represented by a number of cells per certain time required to be output to an output channel for assuring the communication quality of each of said bandwidth demand classes;

determining a one of said bandwidth demand classes to which a call belongs and storing call cells in a buffer corresponding to said determined one of said bandwidth demand classes;

outputting to said output channel cells stored in said buffer for one of said bandwidth demand classes having a counter value not set to zero (0) with priority over cells stored in said buffer for another of said bandwidth demand classes having a counter value set to zero (0); and subtracting one (1) from said value of said counter for said bandwidth demand class that has output a cell.

29. The priority control method of claim 28, wherein said outputting step outputs cells stored in said buffer to said output channel according to a priority defined by said bandwidth demand classes in the presence of a one of said bandwidth demand classes having values of two or more of each counter not set to zero (0).

30. The priority control method of claim 28, wherein said step for setting said guaranteed bandwidth sets said guaranteed bandwidth wider than a logically obtained guaranteed bandwidth in said counter.

31. The priority control method of claim 28, further comprising the steps of:

setting a plurality of best effort classes according to the required communication quality for best effort transfer;

dividing a remaining bandwidth resulting from subtraction of said guaranteed bandwidth from a whole bandwidth of said output channel represented by a number of cells that can be output to said output channel per said certain time, said step of dividing being accomplished according to a ratio of each of said best effort classes to each other and setting divided values in a respective counter for each of said best effort classes when at least one counter for said best effort classes has a count value of zero (0) and all best effort classes are in suspended status;

outputting cells stored in said buffer for either one of said bandwidth demand classes or one of said best effort classes having a counter value not set to zero (0) with priority over cells stored in said buffer for either another of said bandwidth demand classes or another of said best effort classes having a counter value of zero (0); and subtracting one (1) from said counter value of said one of said bandwidth demand classes or said one of said best effort classes that has output a cell.

32. The priority control method of claim 31, further comprising the steps of:

providing a second counter for each of said bandwidth demand classes and said best effort classes, respectively;

setting in respective second counters for said bandwidth demand classes a value obtained by adding a count value of said counter to a count value of said second counter corresponding to respective bandwidth demand classes just before setting said guaranteed bandwidth in said counter of each of said bandwidth demand classes;

setting in respective second counters for said best effort classes a value obtained by adding a count value of said counter to a count value of said second counter corresponding to respective best effort classes just before setting a value in said counter of each of said best effort classes;

outputting to said output channel cells stored in said buffer for another of said bandwidth demand classes having said counter value not set to 0 and subtracting 1 from said counter value of said another bandwidth demand class that has output a cell;

outputting to said output channel cells stored in said buffer for a third bandwidth demand class having said counter value equal to 0 and said second counter value not set to 0 and subtracting 1 from said value of said second counter of said third bandwidth demand class that has output a cell;

outputting to said output channel cells stored in said buffer for another of said best effort classes having a value not equal to zero obtained by adding said counter value to said second counter value and subtracting 1 from said counter value of said another best effort class that has output a cell; and outputting to said output channel cells stored in said buffer for a fourth bandwidth demand class having both counter values equal to 0.

33. The priority control method of claim 32, further comprising the steps of:

setting a first threshold value in said buffer for each of said bandwidth demand classes; and giving a priority to a priority one of said bandwidth demand classes having a number of cells stored in said buffer for said priority one of said bandwidth demand classes larger than said first threshold value over a non-priority one of said bandwidth demand classes having said number of cells stored in said buffer for said non-priority one of said bandwidth demand classes smaller than said first threshold value.

34. The priority control method of claim 33, further comprising the steps of:

setting a second threshold value larger than said first threshold value in said buffer for each of said bandwidth demand classes; and giving a priority to a second priority bandwidth demand class having said number of cells stored in said buffer for said second priority bandwidth demand class larger than said second threshold value over a second non-priority bandwidth demand class having said number of cells stored in said buffer for said second non-priority bandwidth demand class smaller than said second threshold value.

* * * * *